United States Patent [19]

Hwang

[11] Patent Number: 5,184,607
[45] Date of Patent: Feb. 9, 1993

[54] AUTOMOBILE MASSAGING DEVICE

[76] Inventor: Haw C. Hwang, No. 3, Lane 21, Hsing Der Rd., Taipei, Taiwan

[21] Appl. No.: 827,701

[22] Filed: Jan. 27, 1992

[51] Int. Cl.⁵ .................................. A61H 7/00
[52] U.S. Cl. ............................. 128/52; 128/33
[58] Field of Search .................. 128/33, 51, 52

[56] References Cited

U.S. PATENT DOCUMENTS

| | | | |
|---|---|---|---|
| 4,615,336 | 10/1986 | Fijimoto | 128/52 |
| 4,686,967 | 8/1987 | Hashimoto | 128/52 |
| 4,718,408 | 1/1988 | Barreiro | 128/52 |

Primary Examiner—Robert A. Hafer
Assistant Examiner—David J. Kenealy

[57] ABSTRACT

An automobile massaging device comprising a slide base driven to alternatively move forward and backward along two parallel guide rails inside an automobile seat by a first reversible motor and transmission gear set, and a pendulum driven to alternatively rotate back and forth by a second reversible motor and transmittion gear set on the slide base is disclosed. Contact switches are mounted on the guide rails and second reversible motor respectively to trigger the first and second reversible motors changing their rotation directions alternatively.

6 Claims, 3 Drawing Sheets

AUTOMOBILE MASSAGING DEVICE

BACKGROUND OF THE INVENTION

The present invention relates to massaging devices and relates more particularly to a massaging device for use in an automobile.

While taking a car trip for a long distance one may have to sit in an automobile seat for a long length of time. However, it is not comfortable to sit in an automobile seat for a long length of time. The present invention has been accomplished to provide an automobile massaging device used in massaging the back of a person who sits on an automobile seat.

SUMMARY OF THE INVENTION

According to the present invention, there is provided an automobile massaging device which is generally comprised of a slide base which is driven to alternatively move forward and backward along two parallel guide rails inside an automobile seat by a first reversible motor and transmission gear set, and a pendulum which is driven to alternatively rotate back and forth by a second revesible motor and transmission gear set on the slide base. Contact switches are mounted on the guide rails and second reversible motor respectively to trigger the first and second reversible motors to change their rotation directions alternatively.

DETAILED DESCRIPTION OF THE PREFERRED EMBODIMENT

Figure 4:
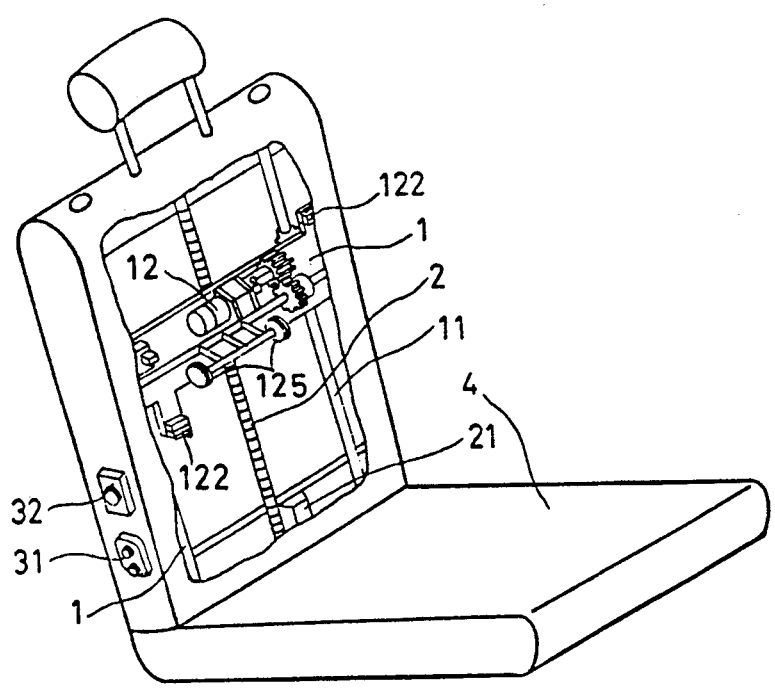
FIG. 4 is a perspective view of an automobile seat as constructed in accordance with the present invention.
Figure 1:
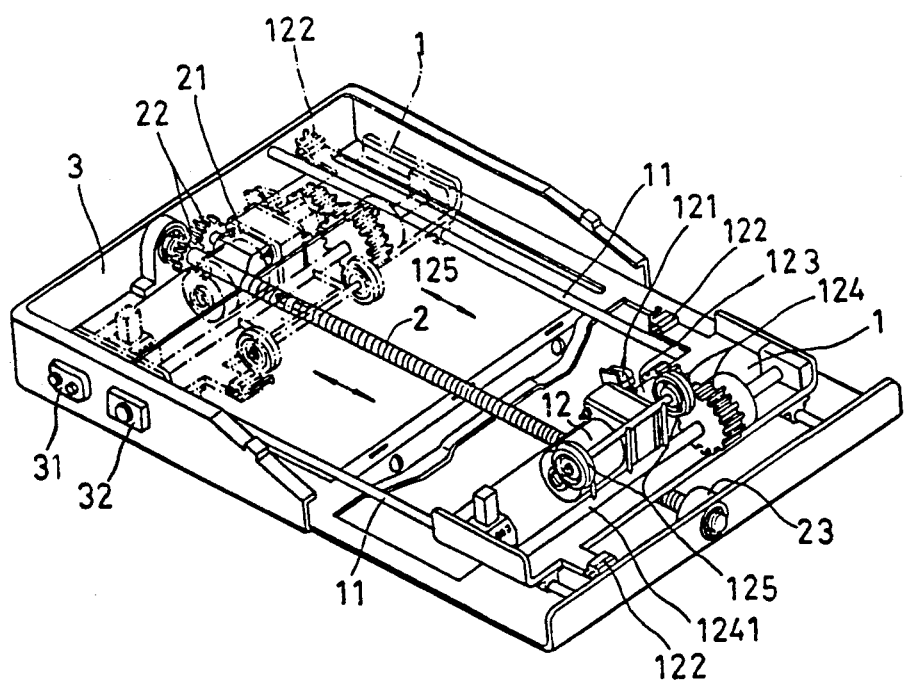
FIG. 1 is a perspective view of a massaging device embodying the present invention.
Figure 2:
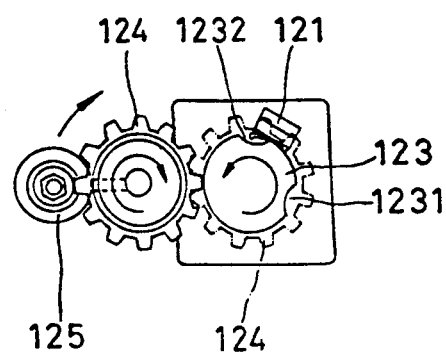
FIGS. 2 and 3 are plan views showing the reciprocating movement of the pendulum.
Figure 3:
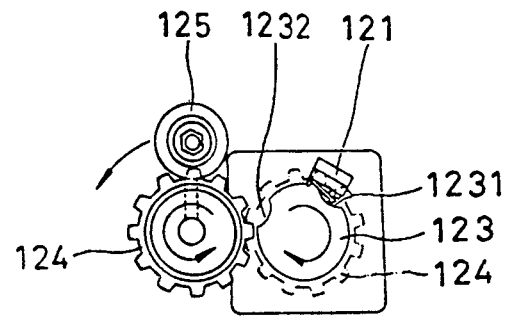
Figure 5:
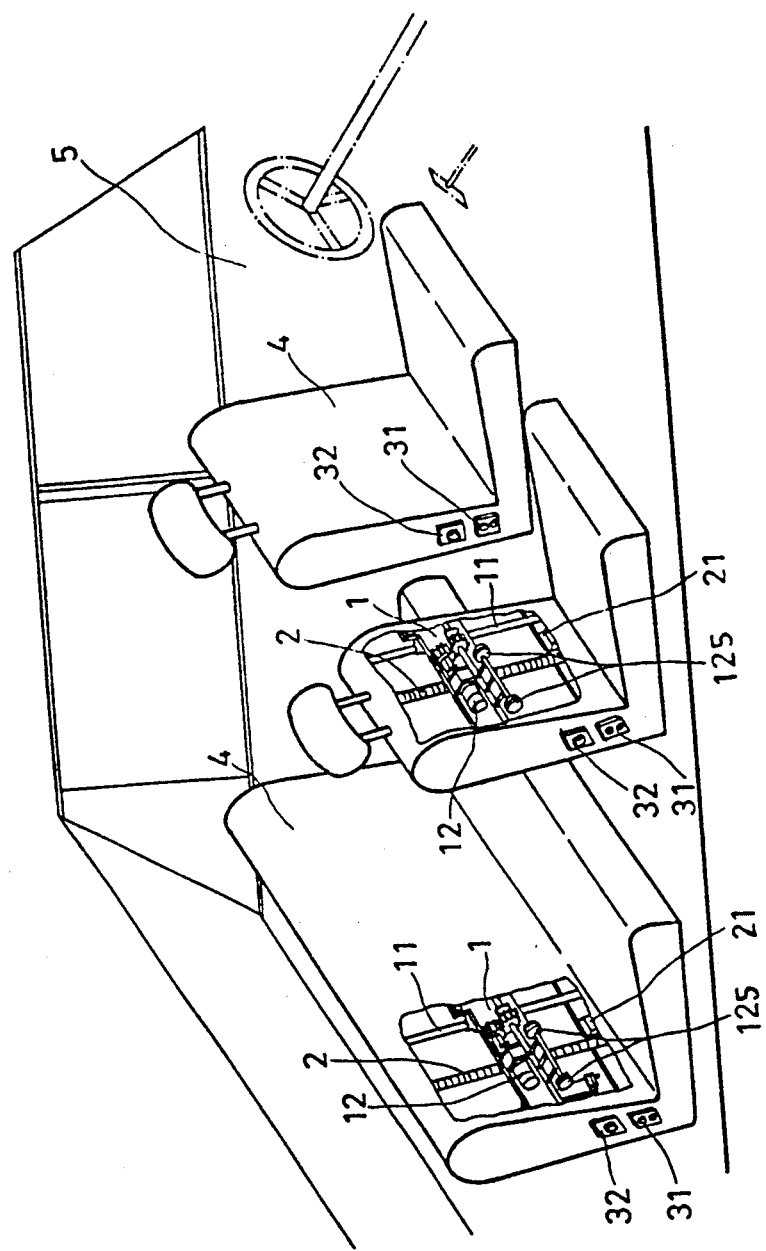
FIG. 5 is an elevational view showing an arrangement of the present invention in an automobile.

Referring to FIGS. 1, 2, 3 and 4, a slide base 1 is mounted on a pair of guide rails 11 in a seat frame 3 of an automobile seat 4. The slide base 1 has an element 23 on its bottom edge coupled to a guide screw 2. The guide screw 2 is driven to rotate by a reversible motor 21 via a gear set 22. Rotating the motor 21 causes the slide base 1 to move back and forth on the guide rails 11. Two contact switches 122 are secured to the slide base 1 at two opposite sides and are respectively connected to the reversible motor 21 for controlling it to change its rotation direction. Slide base 1 further comprises a reversible motor 12 and a gear set 124 on a top edge thereof. A pendulum 125 is connected to a revolving axle 1241 which is driven to rotate by the reversible motor 12 via the gear set 124. A rotary member 123, which has two recesses 1231, 1232 (see FIGS. 2 and 3) is coupled to the reversible motor 12. Two opposed contact switches 121 are mounted on the reversible motor 12 at a suitable location to match with the operation of the rotary member 123. Actuation of reversible motor 12 causes the rotary member 123 to rotate. When the swinging conductor of one contact switch 121 enters one recess 1231, the reversible motor 12 is caused to change its rotation direction. Once the swinging conductor of the other contact switch 121 enters the other recess 1232, the reversible motor 12 is caused to change its rotation direction again. Therefore, the pendulum 125 is alternatively rotated back and forth when the slide base 1 is alternatively moved forward and backward. When not in use, the pendulum 125 is retained in a downward suspension position, and therefore, the automobile seat 4 still feels comfortable.

What is claimed is:

1. An automobile massaging device comprising:

a support frame having first and second end portions;

a pair of spaced, substantially parallel guide rails fixedly mounted between the first and second end portions of said support frame;

a guide screw rod rotatably mounted to said support frame, said guide screw rod being located between said pair of spaced guide rails and being substantially parallel thereto;

a first reversible motor secured to said support frame, said first reversible motor including an output shaft;

means for drivingly connecting said first reversible motor to said guide screw rod such that activation of said first reversible motor causes rotation of said guide screw rod;

a slide base linearly, movably supported upon said pair of spaced guide rails and connected to said guide screw rod such that rotation of said guide screw rod in alternating directions by said first reversible motor causes said slide base to reciprocate relative to said support frame upon said pair of spaced guide rails;

first switch means carried by said support frame and said slide base for automatically triggering the reversal of the direction of rotation of the output shaft of said first reversible motor upon movement of said slide base, upon said pair of spaced guide rails, a predetermined distance relative to said support frame;

a second reversible motor secured to said slide base, said second reversible motor including an output shaft;

a first gear carried by the output shaft of said second reversible motor, said first gear including a pair of recesses formed at spaced intervals about the periphery thereof;

a second gear meshingly engaged and adapted to be driven by said first gear;

an axle member rotatably mounted upon said slide base, said axle member carrying said second gear;

a pendulum massaging unit carried by said axle member such that rotation of said axle member by said second reversible motor, through said first and second gears, causes said pendulum massaging unit to swing; and second switch means for automatically triggering said second reversible motor to reverse the rotational direction of said first gear and the swinging direction of said pendulum massaging unit, said second switch means including a contact member that is adapted to alternately project within said pair of recesses formed in said first gear to trigger the reversal of said second reversible motor.

2. An automobile massaging device as claimed in claim 1, wherein said means for drivingly connecting said first reversible motor to said guide screw rod comprises a third gear carried by said guide screw rod adjacent one end thereof and a fourth gear carried by the output shaft of said first reversible motor, said fourth gear being interengaged with said third gear such that activation of said first reversible motor causes rotation of said guide screw rod.

3. An automobile massaging device as claimed in claim 1, wherein the output shaft of said second reversible motor extends substantially perpendicular to said guide screw rod.

4. An automobile massaging device as claimed in claim 3, wherein the output shaft of said first reversible motor extends substantially parallel to said guide screw rod.

5. An automobile massaging device as claimed in claim 1, wherein said first switch means comprises a pair of switch units mounted on opposite sides of said support frame and said slide base respectively.

6. An automobile massaging device as claimed in claim 1, wherein said second switch means is carried by said second reversible motor.

* * * * *